United States Patent
Ostholt et al.

(10) Patent No.: US 11,065,716 B2
(45) Date of Patent: Jul. 20, 2021

(54) METHOD FOR PROCESSING, IN PARTICULAR SEPARATING, A SUBSTRATE BY MEANS OF LASER-INDUCED DEEP REACTIVE ETCHING

(71) Applicant: LPKF Laser & Electronics AG, Garbsen (DE)

(72) Inventors: Roman Ostholt, Langenhagen (DE); Norbert Ambrosius, Garbsen (DE); Daniel Dunker, Hannover (DE); Arne Schnoor, Hannover (DE)

(73) Assignee: LPKF LASER & ELECTRONICS AG, Garbsen (DE)

( * ) Notice: Subject to any disclaimer, the term of this patent is extended or adjusted under 35 U.S.C. 154(b) by 0 days.

(21) Appl. No.: 16/613,444

(22) PCT Filed: Apr. 6, 2018

(86) PCT No.: PCT/EP2018/058882
§ 371 (c)(1),
(2) Date: Nov. 14, 2019

(87) PCT Pub. No.: WO2018/210484
PCT Pub. Date: Nov. 22, 2018

(65) Prior Publication Data
US 2020/0180068 A1   Jun. 11, 2020

(30) Foreign Application Priority Data

May 15, 2017   (DE) .................. 10 2017 110 542.5

(51) Int. Cl.
*B23K 26/0622*   (2014.01)
*B23K 26/362*   (2014.01)
(Continued)

(52) U.S. Cl.
CPC .......... *B23K 26/0622* (2015.10); *B23K 26/00* (2013.01); *B23K 26/0006* (2013.01);
(Continued)

(58) Field of Classification Search
None
See application file for complete search history.

(56) References Cited

U.S. PATENT DOCUMENTS

2016/0059359 A1   3/2016   Krueger et al.
2017/0189991 A1*  7/2017   Gollier .............. B23K 26/0006
2018/0340262 A1   11/2018  Hiranuma

FOREIGN PATENT DOCUMENTS

WO   WO 2014161534 A2   10/2014
WO   WO 201604144 A1    1/2016
(Continued)

*Primary Examiner* — Jiong-Ping Lu
(74) *Attorney, Agent, or Firm* — Leydig, Voit & Mayer, Ltd.

(57) ABSTRACT

A method for machining, in particular for cutting an, in particular, planar substrate by laser-induced deep etching includes: moving laser radiation along a machining line; directing individual pulses onto the planar substrate at a spatial laser pulse distance (d); and subsequently removing an anisotropic material by etching at an etching rate (r) and an etching duration (t). Machining parameters are set according to a condition: $1 > d/(R*t) > 10^{-5}$.

12 Claims, 4 Drawing Sheets

(51) Int. Cl.
  *B23K 26/402* (2014.01)
  *C03C 15/00* (2006.01)
  *B23K 26/00* (2014.01)
  *B23K 26/361* (2014.01)
  *C03B 33/02* (2006.01)
  *C03C 23/00* (2006.01)
  *B23K 26/53* (2014.01)
  *B23K 103/00* (2006.01)

(52) U.S. Cl.
  CPC .......... *B23K 26/361* (2015.10); *B23K 26/362* (2013.01); *B23K 26/402* (2013.01); *B23K 26/53* (2015.10); *C03B 33/0222* (2013.01); *C03C 15/00* (2013.01); *C03C 23/0025* (2013.01); *B23K 2103/54* (2018.08)

(56) References Cited

FOREIGN PATENT DOCUMENTS

| | | | |
|---|---|---|---|
| WO | WO 2016010949 A1 | 1/2016 | |
| WO | WO 2016010954 A2 | 1/2016 | |
| WO | WO 2017038075 A1 | 3/2017 | |
| WO | WO2018111998 * | 6/2018 | ............. C03B 33/02 |

* cited by examiner

METHOD FOR PROCESSING, IN PARTICULAR SEPARATING, A SUBSTRATE BY MEANS OF LASER-INDUCED DEEP REACTIVE ETCHING

CROSS-REFERENCE TO PRIOR APPLICATIONS

This application is a U.S. National Phase application under 35 U.S.C. § 371 of International Application No. PCT/EP2018/058882, filed on Apr. 6, 2018, and claims benefit to German Patent Application No. DE 10 2017 110 542.5, filed on May 15, 2017. The International Application was published in German on Nov. 22, 2018 as WO/2018/210484 under PCT Article 21(2).

FIELD

The invention relates to a method for machining, in particular for cutting an, in particular, planar substrate by means of laser-induced deep etching, pulsed laser radiation being directed onto the substrate at a spatial laser pulse distance and subsequently an anisotropic material removal being carried out by etching at an etching rate and an etching duration.

BACKGROUND

The method of the type in question for the precision machining of glass by means of laser-induced deep etching has become known as LIDE (laser-induced deep etching). The LIDE process allows extremely precise holes (through-glass vias=TGV) and structures to be introduced at maximum speed and thus creates the prerequisites for the increased use of glass as a material in microsystems technology.

During laser-induced deep etching (for example, WO 2014/161534 A2 and WO 2016/04144 A1), a transparent material is modified by means of a laser pulse or a pulse sequence over an elongated region along the beam axis, frequently over the entire thickness of the transparent material, for example, in the case of glass panels, so that the modification is anisotropically etched in a subsequent wet chemical etching bath. If the laser pulses are emitted onto the material at a suitable spatial distance along a contour, the material is cut along the contour during the anisotropic material removal.

The laser energy input is used to excite or trigger a reaction and a modification by conversion, the effect of which only leads to, or is used for, the desired material cutting in the subsequent method step.

Since the cutting process is carried out by an etching method based on the modification and, if necessary, a subsequent anisotropic material removal step, it is possible to use a planar-action removal process, which places only very low requirements on the process, rather than a sequential process for the cutting operation. In particular, over the duration of the action, the material removal can be concurrently carried out quantitatively and qualitatively for all regions that are pretreated in the described manner and correspondingly modified, thereby considerably reducing the overall time expenditure for creating the plurality of recesses or through-openings.

Since the mutually spaced points of action of the individual pulses are provided in a chain-like manner by virtue of the operating principle and are subsequently connected by the etching process, as a result of which the cutting surface arises, the cutting surface is not flat. Rather, a corrugation or a tooth structure is created, similar to a connected perforation.

This essentially undesirable uneven cutting surface can be set by the laser pulse distance, wherein it is generally assumed that a small laser pulse distance results in a less pronounced shape of the ripples or combs.

Thus, the two fundamental goals of rapid machining progress as a result of large laser pulse distances on the one hand, and the smoothest possible course of the cut surface approximating a planar course on the other hand, conflict with one another in the method.

SUMMARY

In an embodiment, the present invention provides a method for machining, in particular for cutting an, in particular, planar substrate by laser-induced deep etching, comprising: moving laser radiation along a machining line; directing individual pulses onto the planar substrate at a spatial laser pulse distance (d); and subsequently removing an anisotropic material by etching at an etching rate (r) and an etching duration (t), wherein machining parameters are set according to a condition:

$$1 > d/(R^*t) > 10^{-5}.$$

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides an option for optimally meeting or reconciling these two goals.

According to the invention, a method is thus provided in which the machining parameters are determined according to the following rule:

$$1 > d/(R^*t) > 10^{-5},$$

preferably according to the condition:

$$1 > d/(R^*t) > 10^{-3},$$

where d=laser pulse distance, R=etching rate, and t=etching duration.

The machined side surfaces of the substrates or components cut according to the LIDE method thus have a reduced roughness, wherein the invention is based on the surprising finding with regard to the dependence of the roughness on the pulse distance and the etching time that the pulse distance is not selected to be as small as possible for a surface that is as smooth as possible, but instead must be determined according to the above-described rule.

In particular, the roughness of the surface typically has a local minimum of approximately 1 μm to 3 μm, as a function of the pulse distance. The position of this minimum depends on the substrate material, the etching chemicals used, and further process parameters.

According to the invention, an anisotropic material removal in the etching bath is made possible at the points that were modified by the laser radiation. This makes it possible to create structures having large aspect ratios (thickness D of the substrate to the cutting gap width b), with the condition $$12>D/b>1.$$

The material removal by wet chemical etching, described by the product of the etching rate R and the etching duration t, is small compared to the thickness D of the substrate. Preferably, the following applies:

$$D/(R*t)>3.$$

Particularly preferably, the following applies:

$$D/(R*t)>12.$$

The substrate material used is preferably glass, which is transparent to the wavelength used for the laser-induced deep etching. Particularly large aspect ratios and low roughness can be achieved with fused silica.

Figure 1:
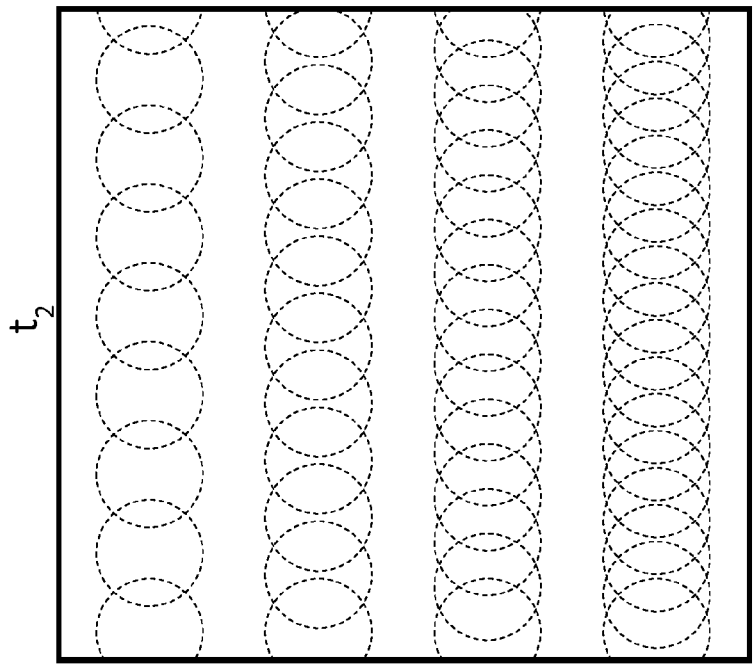
FIG. 1 shows a representation of different laser pulse distances (d) and etching durations (t)
Figure 1:
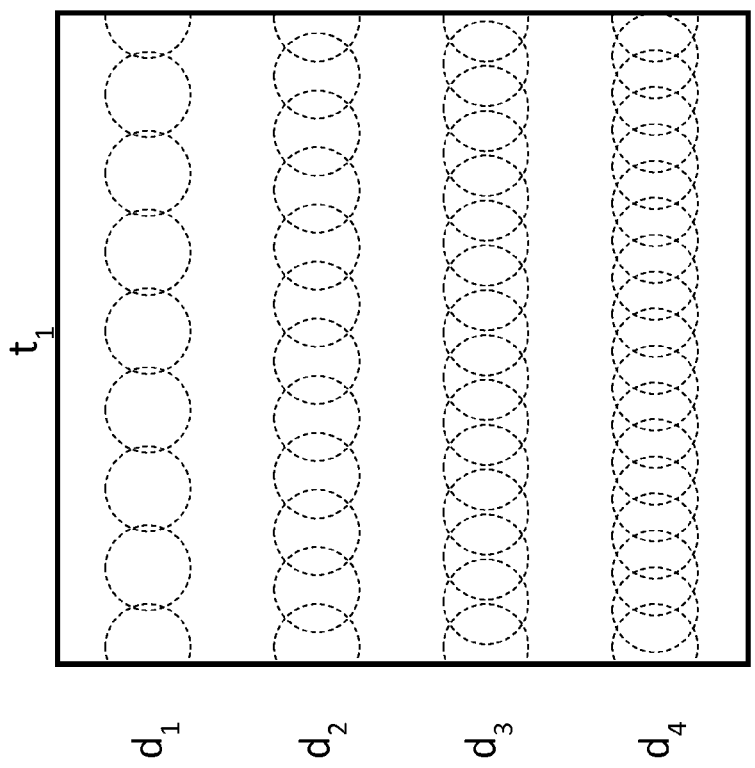

FIG. 1 schematically shows how different ripples or roughnesses of the cut surfaces arise as a function of the laser pulse distance d and the etching duration t (at a constant etching rate R). As expected, the roughness decreases the smaller the pulse distance d and the larger the etching duration t are selected.

Figure 2:
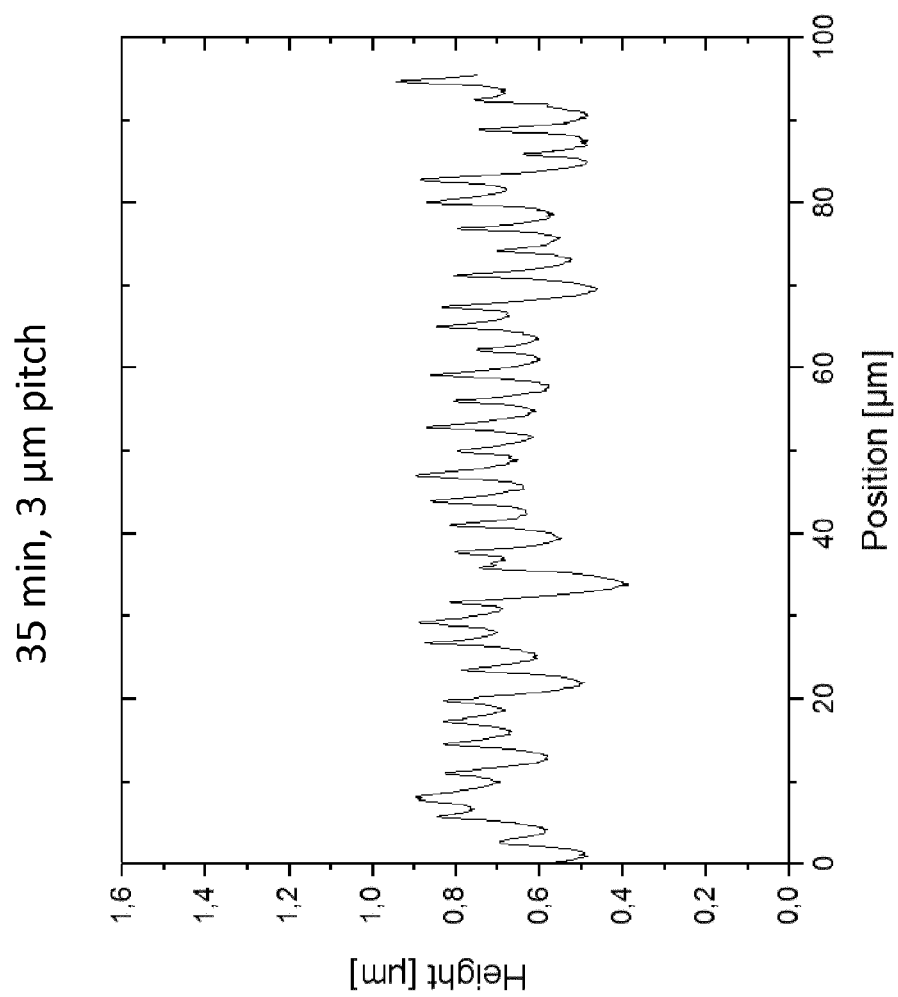
FIG. 2 shows an illustration of a surface profile of a cut surface at a laser pulse distance (d=3 µm) and an etching duration (t=35 min)
Figure 3:
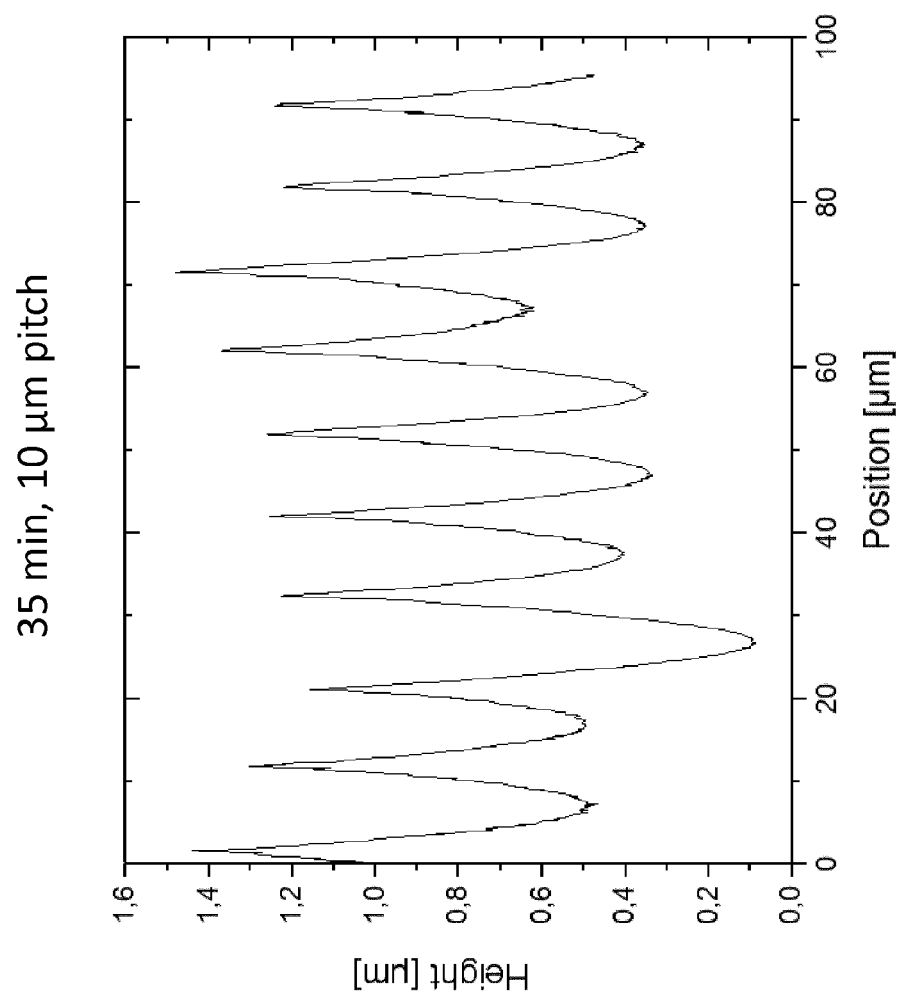
FIG. 3 shows an illustration of a surface profile of a cut surface at a laser pulse distance (d=10 µm) and an etching duration (t=35 min)

This is illustrated in FIGS. 2 and 3 based on surface profiles of the cut surfaces. At the same etching duration t=35 min and the same etching rate R, that is, at the same product R*t and thus the same material removal by wet chemical etching, very different surfaces result from two laser pulse distances d=3 μm (FIG. 2) and d=10 μm (FIG. 3).

Figure 4:
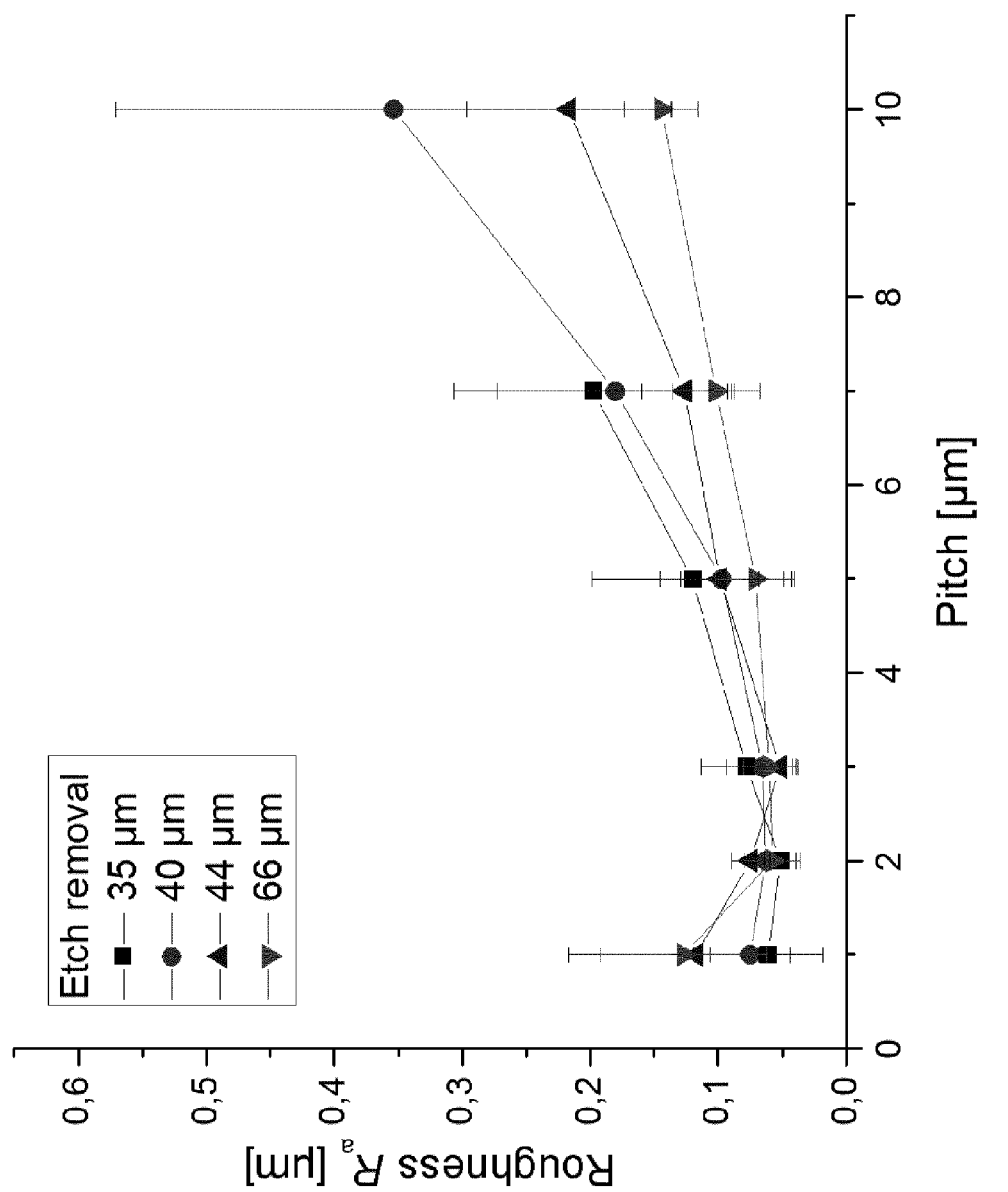
FIG. 4 shows the ratio of the laser pulse distance (d) to the roughness $R_a$ at different material removal levels.

FIG. 4 shows the dependence of the roughness $R_a$ (roughness) on the laser pulse distance d (pitch) for different material removals (etch removal). At a laser pulse distance d of approximately 2 to 3 μm, a local minimum of the roughness $R_a$ of approximately 0.05 to 0.08 μm is achieved. This is only influenced to a minor degree by the material removal, the product of the etching rate and the etching duration.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for machining a planar substrate by laser-induced deep etching, comprising:
   determining a local minimum of roughness which would be achieved for a cutting line in the planar substrate at different spatial laser pulses distances (d);
   moving laser radiation along a machining line;
   directing individual pulses onto the planar substrate at a spatial laser pulse distance (d) selected based on the determined local minimum of roughness; and
   subsequently removing material by anisotropic etching at an etching rate (R) and an etching duration (t),
   wherein machining parameters meet the following condition:

$$1>d/(R*t)>10^{-5}.$$

2. The method according to claim 1, wherein the machining parameters meet the following condition:

$$1>d/(R*t)>10^{-3}.$$

3. The method according to claim 1, wherein an aspect ratio of a thickness (D) of the planar substrate to a cutting gap width (b) is set transversely to the machining line according to a condition:

$$12>D/b>1.$$

4. The method according to claim 1, wherein a ratio of the starting thickness (D) of the planar substrate to a product of the etching rate (R) and the etching duration (t) is greater than 3:

$$D/(R*t)>3.$$

5. The method according to claim 4, wherein the ratio of the starting thickness (D) of the planar substrate to the product of the etching rate (R) and the etching duration (t) is greater than 5:

$$D/(R*t)>5.$$

6. The method according to claim 5, wherein the ratio of the starting thickness (D) of the planar substrate to the product of the etching rate (R) and etching duration (t) is greater than 8:

$$D/(R*t)>8.$$

7. The method according to claim 6, wherein the ratio of the starting thickness (D) of the planar substrate to the product of the etching rate (R) and the etching duration (t) is greater than 10:

$$D/(R*t)>10.$$

8. The method according to claim 7, wherein the ratio of the starting thickness (D) of the planar substrate to the product of the etching rate (R) and the etching duration (t) is greater than 12:

$$D/(R*t)>12.$$

9. The method according to claim 1, wherein the substrate comprises glass.

10. The method according to claim 9, wherein the glass comprises fused silica.

11. The method according to claim 1, wherein the spatial laser pulse distance (d) is in a range from 2 to 3 μm.

12. The method according to claim 11, wherein the etching duration (t) is not greater than 35 minutes.

* * * * *